United States Patent
Kang et al.

(10) Patent No.: US 7,706,453 B2
(45) Date of Patent: Apr. 27, 2010

(54) ITERATIVE CHANNEL PREDICTION

(75) Inventors: Insung Kang, San Diego, CA (US);
Yunho Lee, West Lafyette, IN (US)

(73) Assignee: VIA Telecom Co., Ltd. (KY)

( * ) Notice: Subject to any disclaimer, the term of this patent is extended or adjusted under 35 U.S.C. 154(b) by 803 days.

(21) Appl. No.: 11/533,382

(22) Filed: Sep. 20, 2006

(65) Prior Publication Data
US 2007/0064840 A1 Mar. 22, 2007

Related U.S. Application Data

(60) Provisional application No. 60/718,825, filed on Sep. 20, 2005.

(51) Int. Cl.
*H04L 27/00* (2006.01)
(52) U.S. Cl. .................... 375/259; 375/224
(58) Field of Classification Search ........... 375/224, 375/227–228, 259, 340; 370/241, 252
See application file for complete search history.

(56) References Cited

U.S. PATENT DOCUMENTS

| | | | | |
|---|---|---|---|---|
| 4,862,483 A * | 8/1989 | Clark | | 375/341 |
| 5,005,188 A * | 4/1991 | Clark | | 375/341 |
| 5,581,580 A * | 12/1996 | Lindbom et al. | | 375/340 |
| 5,799,047 A * | 8/1998 | Dobrica | | 375/350 |
| 6,370,189 B1 * | 4/2002 | Morrison et al. | | 375/224 |
| 6,570,910 B1 | 5/2003 | Bottomley et al. | | |
| 6,771,723 B1 * | 8/2004 | Davis et al. | | 375/350 |
| 6,985,469 B2 * | 1/2006 | Leung | | 370/335 |
| 7,085,332 B2 * | 8/2006 | Molnar | | 375/316 |
| 7,206,290 B2 * | 4/2007 | Qi et al. | | 370/252 |
| 7,409,016 B2 * | 8/2008 | Kim et al. | | 375/340 |
| 2002/0097686 A1 * | 7/2002 | Qiu | | 370/252 |
| 2003/0016765 A1 * | 1/2003 | Hwang | | 375/316 |
| 2003/0017835 A1 | 1/2003 | Bergel | | |
| 2005/0210493 A1 * | 9/2005 | Yamauchi et al. | | 720/725 |

FOREIGN PATENT DOCUMENTS

CN 1579077 2/2005

OTHER PUBLICATIONS

Hwang, J. K. And Winters, J. H., "Sinusoidal Modeling and Prediction of Fast Fading Processes," IEEE Globecom 98, Nov. 1998.
Hui, Chen et al. "Analysis of the Decorrelation Performance of Linear Prediction Algorithm." Systems Engineering and Electronics. Jan. 2005. vol. 27 No. 1 pp. 155-158.

* cited by examiner

*Primary Examiner*—Jean B Corrielus
(74) *Attorney, Agent, or Firm*—James W. Huffman; Joseph G. Swan

(57) ABSTRACT

Provided are systems, methods and techniques for predicting a communication channel parameter. In one representative embodiment, values of a communication channel parameter are estimated at a plurality of previous points in time, values are predicted for the communication channel parameter at a plurality of such previous points in time, using a plurality of the channel estimates, and then the channel estimates are updated using the predictions, with the latter prediction and estimation steps being repeated until a specified condition has been satisfied.

20 Claims, 3 Drawing Sheets

ITERATIVE CHANNEL PREDICTION

This application claims the benefit of U.S. Provisional Patent Application Ser. No. 60/718,825, filed on Sep. 20, 2005, and titled "Iterative Channel Prediction with Uniform SNR Enhancement", which application is incorporated by reference herein as though set forth herein in full.

FIELD OF THE INVENTION

The present invention pertains to systems, methods and techniques for predicting a communication channel parameter and is applicable, e.g., to predicting the attenuation and phase change caused by a wireless communication channel.

BACKGROUND

Both the magnitude and phase shift attributable to a communication channel often vary over time. In the case of a wireless communication channel, such changes can result from any of the number of different factors, e.g., related to movement of a mobile wireless device, and/or to changes in the environment between the two communicating devices (e.g., a cellular telephone and a base station) irrespective of any movement of either device.

In order to properly interpret received data, it is desirable for the wireless receiver to be able to predict or estimate such parameters for each time frame in which data are received. Unfortunately, in addition to the fact that the characteristics of the channel itself change over time, any transmitted information also is corrupted by noise (usually is modeled as white Gaussian noise), making accurate predictions or estimations of the channel more difficult.

Channel estimation often is performed using a technique in which the transmitter sends not only information symbols, but periodically also sends predetermined values (typically referred to as pilot signals). Then, any deviations in the received signal from the expected pilot can be attributed either to the communication channel or to noise. The main problem of both channel estimation and channel prediction is to be able to characterize the channel in the presence of such noise.

In addition to using the pilot signal for channel estimation, the received information symbols also can be used for this purpose. That is, the received and decoded symbols often can be assumed to be correct, so the channel can be estimated based on the signal that actually was received as compared with the signal that presumably was sent by the transmitter.

Channel prediction techniques generally rely on the assumption that channel characteristics will be correlated from one timeframe to the next and frequently can be modeled as a function that varies smoothly and not too quickly over time. Accordingly, channel prediction uses channel estimates from one or more time frames in order to predict the channel at a different time frame. From a frequency-domain perspective, the prediction technique generally operates as a low-pass filter, filtering out the higher frequencies of the added noise, and thereby improving the channel measurement signal-to-noise ratio (SNR).

One category of channel prediction uses only past and current channel estimates to predict the next subsequent channel value. Unfortunately, these techniques often suffer from accuracy limitations, essentially requiring extrapolation to the next time frame.

In certain implementations, prior to channel prediction a filtering operation is performed using past, current and subsequent channel estimates. The goal of such filtering is to reduce the channel estimate noise before prediction. In other words, noisy channel estimates are filtered and then subsequently fed into the channel predictor. From the channel predictor's viewpoint, the input SNR is improved. However, the delay introduced by such techniques require the channel predictor to predict the channel farther away from the enhanced channel estimates, thereby detracting from the prediction.

In other words, the filtering used in such techniques tends to reduce sample noise, but the additional delay makes prediction more difficult due to the increased prediction distance, particularly when the channel is changing rapidly. In order to further reduce sample noise, the filter requires longer delays. As a result, there exists a limit on the sample SNR enhancement because longer filtering generally will reduce the benefit of the SNR-enhanced samples.

SUMMARY OF THE INVENTION

The present invention addresses this problem by reducing the sample noise using an iterative technique to enhance samples in a repetitive manner. In the preferred embodiments, all samples are enhanced uniformly before the final prediction is made.

Thus, in one aspect the invention is directed to systems, methods and techniques for predicting a communication channel parameter. In a particular embodiment, values of a communication channel parameter are estimated at a plurality of previous points in time, values are predicted for the communication channel parameter at a plurality of such previous points in time, using a plurality of the channel estimates, and then the channel estimates are updated using the predictions, with the latter prediction and estimation steps being repeated until a specified condition has been satisfied.

By virtue of the foregoing iterative arrangement, it often is possible to obtain good channel prediction results without the necessity of introducing a significant delay.

In another aspect, the invention is directed to a system for predicting a communication channel parameter, in which a forward-prediction module instantiates a forward-prediction engine a plurality of repetitions. At each repetition, the forward-prediction module inputs a first plurality of channel estimates corresponding to a plurality of points in time and outputs a channel prediction corresponding to a point in time subsequent to any of the first plurality of channel estimates. In addition, a backward-prediction module instantiates a backward-prediction engine a plurality of repetitions, at each repetition inputting a second plurality of channel estimates corresponding to a plurality of points in time and outputting a channel prediction corresponding to a point in time previous to any of the second plurality of channel estimates. An estimation module instantiates an estimation engine a plurality of repetitions, at each repetition inputting (i) the channel prediction made by at least one of the forward-prediction module or the backward-prediction module and (ii) the channel estimate for a same point in time, and then outputting an updated channel estimate for the same point in time.

In a still further aspect, the invention is directed to a system for predicting a communication channel parameter, in which an estimation module obtains a plurality of channel estimates by estimating values of a communication channel parameter and a prediction module obtains a plurality of predictions of values of the communication channel parameter based on the plurality of channel estimates. A re-estimation module updates the channel estimates using the predictions, and a conclusion module predicts a value for the communication channel parameter using the updated channel estimates.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

In one representative embodiment, the present invention uses a channel predictor having an order of p, in which the channel at time m is predicted based on the channel samples at times m−1, m−2, . . . , m−p. The following notation is used in the present discussion:

$\tilde{h}_m(k)$: channel prediction at time m and iteration k;
$\hat{h}_m(k)$: channel estimation at time m and iteration k; and
$\overline{h}_m$: final channel prediction at time m.

Thus, for the order p prediction, the required samples to predict the channel at time m+1 are $\hat{h}_m(k), \hat{h}_{m-1}(k), \hat{h}_{m-p+1}(k)$.

Figure 1:
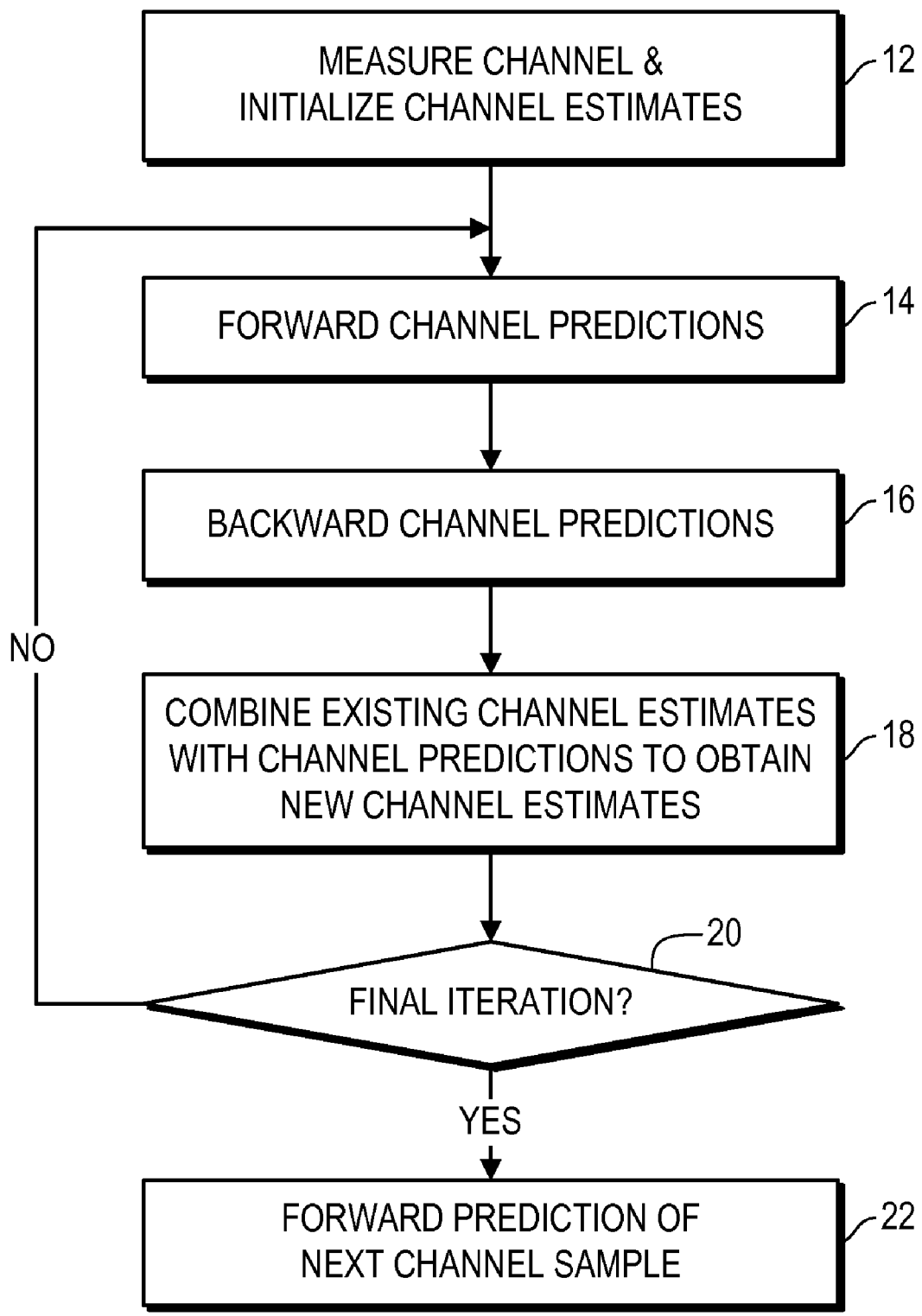
FIG. 1 is a flow diagram illustrating a technique for predicting a channel sample according to a representative embodiment of the present invention.

FIG. 1 is a flow diagram illustrating a technique for predicting a channel sample using channel estimates at a plurality of previous points in time, according to a representative embodiment of the present invention. In order to illustrate the present concepts, the following discussion frequently refers to an example in which a set consisting of the previous 2p channel samples (m, m−1, . . . , m−2p+1) are used to predict the (m+1)$^{th}$ sample. However, it should be emphasized that this example is merely to facilitate the explanation, and the techniques of the present invention can be applied in a number of different ways.

Referring to FIG. 1, initially, in step 12, the subject communication channel (e.g., including a wireless communication link) is measured at a plurality of points in time (e.g., each of equally spaced points m, m−1, . . . , m−2p+1). Such measurements preferably are made using any of the known techniques based on a transmitted and received pilot signal. The resulting measurements are used to initialize the channel estimates at the measured points in time (e.g., $\hat{h}_m(0), \hat{h}_{m-1}(0), \ldots, \hat{h}_{m-2p+1}(0)$).

Next, in steps 14 and 16, using a plurality of the channel estimates (e.g., as generated in step 12 or, as discussed in more detail below, as enhanced in a previous iteration), values for the communication channel are predicted at a number of previous points in time. In the preferred embodiments, predictions are made for all of the same points in time for which the channel estimates were made. As shown in FIG. 1, such predictions preferably are made using two different techniques: forward prediction (step 14) and backward prediction (step 16). Although shown sequentially with step 16 following step 14, such steps instead may be performed in the reverse order or even simultaneously.

In step 14, forward predictions are made for at least some of the time points, preferably the second half of the set of samples in the set of samples that is being processed by the present technique. Any known forward-prediction technique may be used for this purpose. However, in the preferred embodiments a second- or third-order polynomial best-fitting technique is used.

Figure 2:
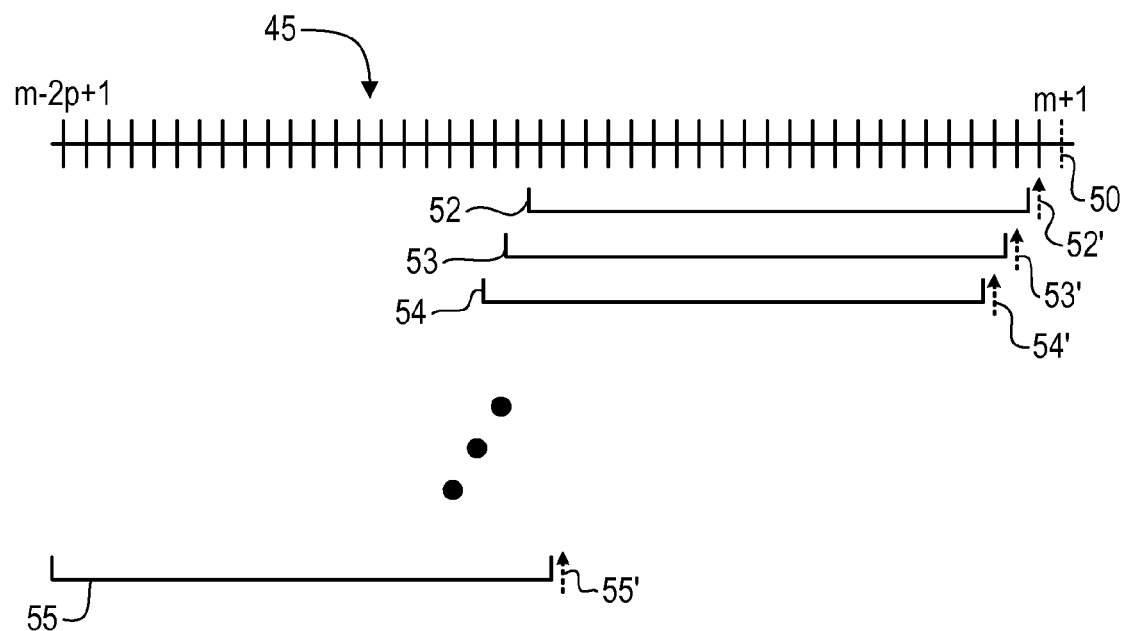
FIG. 2 illustrates a series of forward predictions for use in a prediction technique according to a representative embodiment of the present invention.

An example of the forward-prediction processing performed by step 14 can be seen with reference to FIG. 2. As shown in FIG. 2, a set of previous samples 45 (which includes the 2p samples m, m−1, . . . , m−2p+1) will be used to predict the value of the (m+1)th sample 50. It is assumed that estimates were generated for each of the 2p samples in set 45 during step 12.

The desired predictions preferably are calculated in step 14 using a series of sliding, overlapping windows to obtain the desired channel predictions $\tilde{h}_m(k-1), \tilde{h}_{m-1}(k-1), \ldots, \tilde{h}_{m-p+1}(k-1)$ (e.g., using the estimates within each of windows 52-55 to predict each of samples 52'-55', respectively). For example, $\tilde{h}_m(k-1)$, corresponding to the m$^{th}$ sample 52', is obtained by forward prediction using the p samples within window 52, which includes $\hat{h}_{m-1}(k-1), \hat{h}_{m-2}(k-1), \ldots, \hat{h}_{m-p}(k-1)$. More generally, as shown in FIG. 2, each sample to be forward-predicted preferably is based on a subset of channel estimates immediately preceding it.

Of course, forwardly predicting all of the samples within set 45 would require either reducing the number of samples used for the predictions of the earlier channel samples or using estimates from outside of the set 45 (i.e., earlier samples). However, primarily due to the lack of uniformity of enhancement that would result, neither such approach is believed to provide satisfactory results.

Therefore, in step 16 backward predictions are made for the channel samples in the first half of the set 45. Such predictions preferably are made using the identical prediction technique that is used for the forward predictions in step 14, except applied in a time-reversed manner. However, in alternative embodiments different prediction techniques are used for steps 14 and 16.

Figure 3:
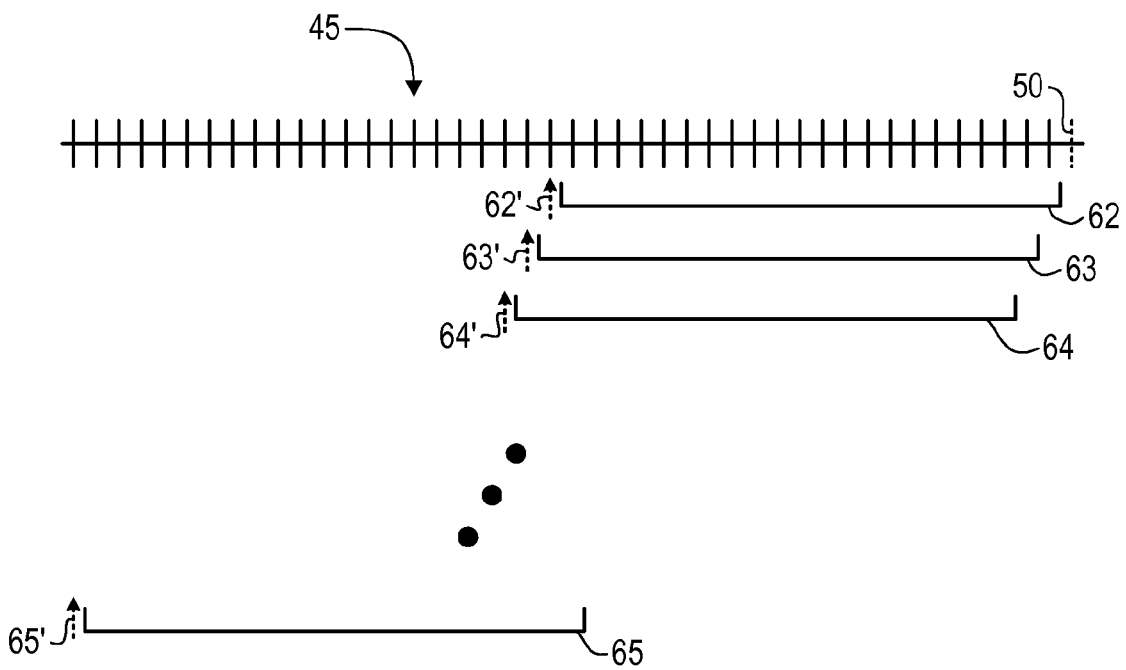
FIG. 3 illustrates a series of backward predictions for use in a prediction technique according to a representative embodiment of the present invention.

FIG. 3 illustrates generation of the backward predictions in the example discussed above. Here also, the desired predictions preferably are made using a series of sliding, overlapping windows. For this step 16, the desired channel predictions preferably are $\tilde{h}_{m-p}(k-1), \tilde{h}_{m-p-1}(k-1), \ldots, \tilde{h}_{m-2p+1}(k-1)$. Thus, for example the estimates within each of windows 62-65 preferably are used to predict each of samples 62'-65', respectively). For example, $\tilde{h}_{m-p}(k)$, corresponding to the (m−p)th sample 62', is obtained by backward prediction using the p samples within window 62, which includes $\hat{h}_{m-p+1}(k-1), \hat{h}_{m-p+2}(k-1), \ldots, \hat{h}_m(k-1)$. More generally, as shown in FIG. 3, each sample to be backward-predicted preferably is based on a subset of channel estimates immediately subsequent to it.

Returning to FIG. 1, in step 18 the predictions and estimates are combined in order to provide new estimates. In the preferred embodiments, during steps 14 and 16 predictions were made for each time point within set 45, so each time point within set 45 preferably has both a prediction and an estimate. Preferably, the estimate for each time point within the set 45 is updated by combining its previous estimate with its current prediction. Such a combination can be performed using a Kalman filter, using any other type of weighted averaging, or in any other known manner.

In step 20, a determination is made as to whether a specified completion criterion (which may be predetermined or specified on-the-fly) has been satisfied. If so, processing proceeds to step 22. If not, processing returns to step 14 to perform the next iteration of prediction and estimation update. Any of a variety of different completion criteria may be used in this step 20, including stopping the process after a fixed number of iterations, a criterion that the estimates generated in step 18 have not changed more than a specified amount from the estimates generated in the previous iteration (or across the last several iterations), or any combination of the foregoing.

Finally, in step 22 a prediction is made for the next channel sample (e.g., m+1) using some or all of the estimates from the final iteration of step 18. In the preferred embodiments, $\hat{h}_m(k)$, $\hat{h}_{m-1}(k), \ldots, \hat{h}_{m-p+1}(k)$ are input into the predictor in order to obtain $\overline{h}_{m+1}$.

It is noted that foregoing iterative technique is able to produce a communication channel prediction that generally has greater accuracy than conventional techniques requiring the same amount of delay. Some reasons for such improved accuracy include: the use of a single set of data for all predictions and estimations, the use of a single window size for all predictions, and the present invention's combination of forward and backward predictions.

Figure 4:
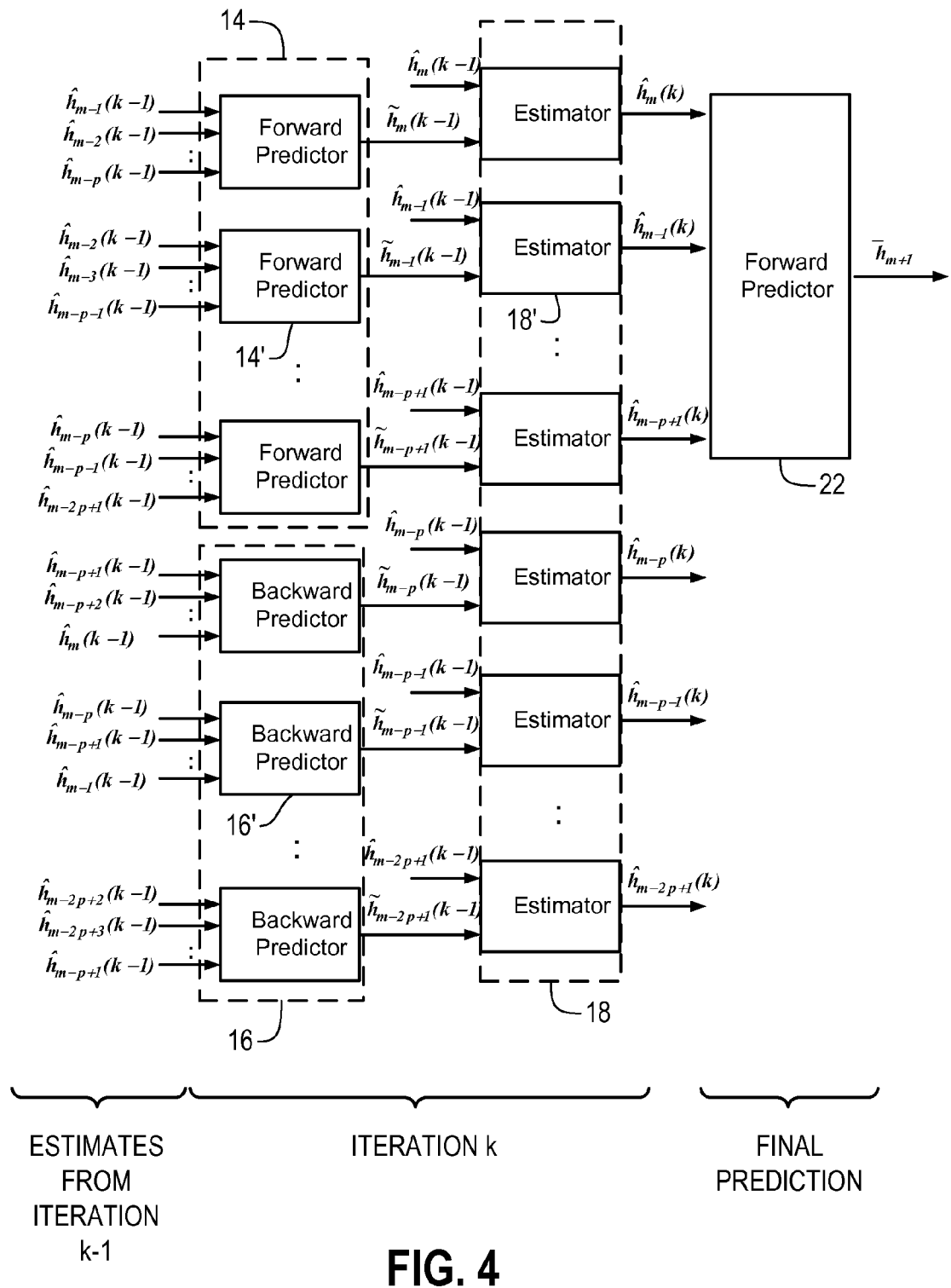
FIG. 4 is a block diagram illustrating a portion of a system for implementing the technique shown in FIG. 1.

FIG. 4 is a block diagram illustrating the final iteration (iteration k) of steps 14, 16 and 18, as well as the final predictions step 22, of the technique described above. As discussed in more detail below, each of the modules illustrated in FIG. 4 can be implemented in any combination of software, hardware or firmware, depending on the desired trade-offs in terms of update flexibility, performance and speed in connection with the specific implementation.

In FIG. 4, forward-prediction module 14 corresponds to forward-prediction step 14 discussed above and is shown as including a number of forward-prediction engines 14'. Once again, depending upon the particular implementation and the desired trade-offs, forward-prediction engines 14' can be either physically distinct components, separate instantiations of the same physical engine, or any combination of the foregoing. In any event, one or more of such engines are instantiated for a plurality of repetitions using estimations that have been received from the previous iteration (i.e., k−1 in this example). The result in each case is a new prediction for one of the channel samples, i.e., one that is subsequent to the group of samples used in making the prediction.

Similarly, backward-prediction module 16 corresponds to backward-prediction step 16 discussed above and is shown as including a number of backward-prediction engines 16'. Depending upon the particular implementation and the desired trade-offs, backward-prediction engines 16' can be either physically distinct components, separate instantiations of the same physical engine, or any combination of the foregoing. In any event, one or more of such engines are instantiated for a plurality of repetitions using estimations that have been received from the previous iteration (i.e., k−1 in this example). The result in each case is a new prediction for one of the channel samples, i.e., one that is previous to the group of samples used in making the prediction.

Together, modules 14 and 16 preferably generate predictions for each sample within the set 45. More preferably, each such prediction is generated using a window of the same size and using only samples from within set 45.

Estimation module 18 corresponds to step 18 discussed above and is shown as including a number of estimation engines 18'. Depending upon the particular implementation and the desired trade-offs, estimation engines 18' can be either physically distinct components, separate instantiations of the same physical engine, or any combination of the foregoing. In any event, one or more of such engines are instantiated for a plurality of repetitions using estimations that have been received from the previous iteration (i.e., k−1 in this example), together with the predictions that have been generated by modules 14 and 16 in the current iteration (i.e., k in this example). The result in each case is a new estimation for one of the channel samples. As indicated above, each estimation engine 18' preferably combines the estimate and prediction for only a single sample in order to provide a new updated estimate for that same sample. In addition, a new updated estimate preferably is generated for each sample within the set 45.

Forward-prediction module 22 corresponds to step 22 discussed above. It preferably operates in the same manner as the individual forward-prediction engines 14' and uses only a portion of the current estimates (e.g., the last half) within set 45 in order to generate a final prediction for the new channel sample (e.g., m+1 in the present example). The predicted channel sample preferably is subsequent to any of the points in time for which predictions and estimates previously were generated by the forward-prediction module 14, the backward-prediction module 16 and the estimation module 18. In any event, the newly generated prediction can then be used for purposes of decoding symbol values received during the corresponding time frame.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

While the present invention generally is described in the context of a wireless communications system, the term "channel" is used herein in a general sense, and refers to any medium through which signals are transmitted. For example, the channel can include a wireless environment, a copper wire, an optical fiber, or even a storage medium. In each case, the received signal differs from the transmitted signal due to the effects of transmission through the channel.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of predicting a communication channel parameter, comprising:
   (a) estimating values of a communication channel parameter at a plurality of previous points in time, thereby obtaining a plurality of channel estimates;
   (b) predicting values for the communication channel parameter at a plurality of said previous points in time by one or more prediction modules, and using a plurality of the channel estimates, thereby obtaining a plurality of predictions;
   (c) updating the channel estimates using the predictions made in step (b) by an estimation module; and
   (d) repeating steps (b)-(c) until a specified condition has been satisfied.

2. A method according to claim 1, further comprising a step of:
   (e) forwardly predicting a value for the communication channel parameter at a point in time using the channel estimates, upon completion of step (d).

3. A method according to claim 2, wherein the point in time for which the value for the communication channel parameter is predicted in step (e) is subsequent to any of the points in time for which predictions and estimates previously were generated in steps (a)-(c).

4. A method according to claim 1, wherein at each iteration, a value is predicted for each of said plurality of previous points in time.

5. A method according to claim 1, wherein said step (b) comprises forwardly and backwardly predicting values for the communication channel parameter.

6. A method according to claim 5, wherein in said step (b) the values for the communication channel parameter at first ones of said plurality of previous points in time are backwardly predicted and values for the communication channel parameter at last ones of said plurality of previous points in time are forwardly predicted.

7. A method according to claim 6, wherein in said step (b) the values for the communication channel parameter at approximately a first half of said plurality of previous points in time are backwardly predicted and values for the communication channel parameter at approximately a last half of said plurality of previous points in time are forwardly predicted.

8. A method according to claim 1, wherein the specified condition in step (d) comprises completion of a fixed number of iterations.

9. A method according to claim 1, wherein the specified condition in step (d) comprises a condition that an amount of change from a previous iteration is within a specified threshold.

10. A system for predicting a communication channel parameter, comprising:
   (a) a forward-prediction module which instantiates a forward-prediction engine for a plurality of repetitions, wherein at each repetition, the forward-prediction engine is configured to input a first plurality of channel estimates corresponding to a plurality of points in time and output a channel prediction corresponding to a point in time subsequent to any of the first plurality of channel estimates;

(b) a backward-prediction module which instantiates a backward-prediction engine for a plurality of repetitions, wherein at each repetition, the backward-prediction engine is configured to input a second plurality of channel estimates corresponding to a plurality of points in time and output a channel prediction corresponding to a point in time previous to any of the second plurality of channel estimates;

(c) an estimation module which instantiates an estimation engine for a plurality of repetitions, wherein at each repetition, the estimation engine is configured to input (i) the channel prediction made by at least one of the forward-prediction module or the backward-prediction module for a first point in time and (ii) the channel estimate for the first point in time, and then outputting an updated channel estimate for the first point in time.

11. A system according to claim 10, further comprising a prediction module which inputs a plurality of the updated channel estimates and outputs a final channel prediction for a specified point in time.

12. A system according to claim 11, wherein the specified point in time is subsequent to any of the points in time for which predictions and estimates previously were generated by said forward-prediction module, said backward-prediction module and said estimation module.

13. A system according to claim 10, wherein each of said forward-prediction module and said backward-prediction module uses a plurality of overlapping windows of channel estimates to generate the corresponding channel predictions.

14. A system according to claim 10, wherein the channel estimates input into the forward-prediction module are received from the estimation module operating in a previous iteration.

15. A system according to claim 10, wherein the forward-prediction module and the backward-prediction module use an identically same prediction technique, but in time-reversed manners.

16. A system according to claim 15, wherein the prediction technique is a polynomial prediction technique.

17. A computer-readable storage medium storing computer-executable process steps for predicting a communication channel parameter, said process steps comprising:

(a) estimating values of the communication channel parameter at a plurality of previous points in time, thereby obtaining a plurality of channel estimates;

(b) predicting values for the communication channel parameter at a plurality of said previous points in time by one or more prediction modules, and using a plurality of the channel estimates, thereby obtaining a plurality of predictions;

(c) updating the channel estimates using the predictions made in step (b) by an estimation module; and (d) repeating steps (b)-(c) until a specified condition has been satisfied.

18. A system for predicting a communication channel parameter, comprising: an estimation module for obtaining a plurality of channel estimates by estimating values of the communication channel parameter;

a prediction module for obtaining a plurality of predictions of values of the communication channel parameter based on the plurality of channel estimates;

a re-estimation module for updating the channel estimates using the predictions; and a conclusion module for predicting a value for the communication channel parameter using the updated channel estimates.

19. A system according to claim 18, wherein the prediction module and the re-estimation module perform iterations until a specified condition has been satisfied.

20. A system according to claim 19, wherein the specified condition comprises a condition that an amount of change from a previous iteration is within a specified threshold.

* * * * *